United States Patent [19]

White

[11] Patent Number: 5,515,717

[45] Date of Patent: May 14, 1996

[54] MATCHING GOLF CLUBS THROUGH DEFLECTION TECHNIQUE

[76] Inventor: Donald White, R431 Winthrop St., Taunton, Mass. 02780

[21] Appl. No.: 301,483

[22] Filed: Sep. 7, 1994

[51] Int. Cl.$^6$ ................................................... G01M 1/00
[52] U.S. Cl. ............................................. 73/65.03; 73/853
[58] Field of Search ........................ 73/65.03, 65.07, 73/65.09, 853, 854, 856

[56] References Cited

U.S. PATENT DOCUMENTS

| | | | |
|---|---|---|---|
| 4,261,566 | 4/1981 | MacDougall | 73/65.03 |
| 4,603,577 | 8/1986 | Johnson | 73/65.03 |
| 5,285,680 | 2/1994 | Sun | 73/65.03 |

*Primary Examiner*—Richard Chilcot
*Assistant Examiner*—Max Noori

[57] ABSTRACT

A deflection technique utilizing an electronic force gauge to match the flexibility of a set of golf clubs consisting of a bracket at one end of a rectangular backboard which holds the butt end of the shaft to be measured, a movable bracket at the other end of the backboard to which a horizontal bar is attached against which the tip end of said shaft is held, and a bracket attached to an electronic force gauge mounted between the two aforementioned brackets with said gauge measuring the shaft's resistance to pressure when the tip end of the shaft is manipulated downward.

7 Claims, 5 Drawing Sheets

MATCHING GOLF CLUBS THROUGH DEFLECTION TECHNIQUE

BACKGROUND—FIELD OF INVENTION

The present invention relates to a method for matching the flexibility of a set of golf clubs through an improved deflection technique utilizing an electronic force gauge.

BACKGROUND—DESCRIPTION OF PRIOR ART

Golf clubs are made of three components: a grip, a shaft, and a clubhead. While there are only three basic components, however, the combination of specifications into which the three components can be joined is virtually limitless as the characteristics of each manufactured part vary from club to club. Producers of golf clubs each use their own distinct methods to measure the equipment they create thereby failing to establish an industry standard against which all clubs could be evaluated. The result of this autonomy within the industry is that individual golf clubs within a set most often possess different qualities of flexibility than their mates. This is true not so much because of variances among grips or clubheads as deviations are slight, but because of differences in shaft flexibility.

Shafts are matched to one another by determining their "flex," yet this "flex" is an arbitrary and relative designation and varies widely within specific flex designations. In general, the designation "X" stands for extra-stiff shaft, "S" for stiff shaft, "R" for regular shaft, and "L" for lady or flexible shaft. The basic problem, however, is that there is no common way to measure flex, hence the "X" of one manufacturer could be the "S" of another. In fact, even shafts made from the same die can vary substantially.

An early and still prevalent method used to attempt to match the characteristics of a set of golf clubs is swing-weight matching. This method measures a golf club's weight about a fulcrum point, with the fulcrum point determined by a measuring apparatus such as in MacDougall (1981) or Sun (1994). Swing-weight matching uses as its cornerstone for measurement the variables of club weight and club length, and fails to take into account the more significant variables of shaft flexibility and strength.

A more advanced system of measurement and the most prevalent system in use today os frequency matching. Frequency matching produces matched golf clubs from a universal blank of shaft of predetermined length by removing both the grip and butt end portions of the blank (with knowledge of the natural frequency of the shaft) until a desired frequency of the shaft is achieved. While this method does produce a set of golf clubs with similar shaft strength characteristics, the method is extremely time consuming, requires factoring in complicated variables which necessitates the use of a trained operator, and is not cost effective.

What is needed is a device and method to match a set of golf clubs in accordance with the variables of shaft strength and flexibility which is both simple and cost effective. It is an object of the present invention to supply such a device and method whereby a set of golf club shafts can be matched simply, cos effectively, and with a consistent pattern of shaft strength and flexibility.

DESCRIPTION OF THE PREFERRED EMBODIMENT

Referring to FIGS. 1 through 4, the rectangular backboard of the invention is generally indicated at 10, the shaft butt stop and pressure bar bracket is generally indicated at 11, the digital force gauge bracket is generally indicated at 12, and the deflection bar assembly bracket is generally indicated at 13.

Figure 2:
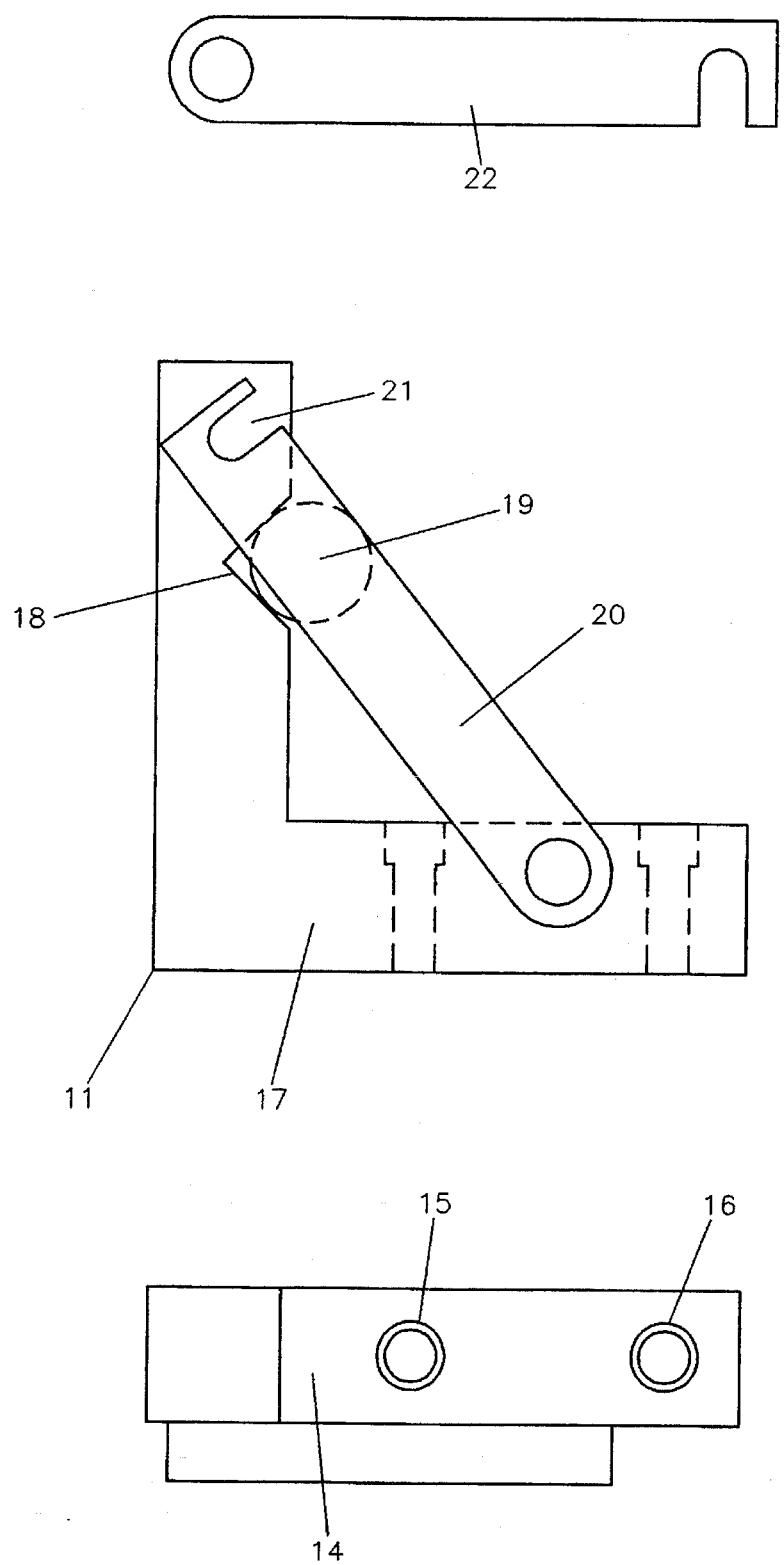
FIG. 2 isolates the shaft butt stop and pressure bar assembly.

Referring now to FIG. 2, the details of the shaft butt stop and pressure bar bracket are shown. The bracket which is attached to the face of the rectangular backboard is illustrated at 14. It is attached to the backboard by two screws, rivets or other fastening devices which are inserted through two bored holes 15, 16 in the bracket. It is attached to the backboard in the approximate position shown in 11. The shaft butt stop assembly attached to the side of the pressure bar 17 at a right angle to the backboard. The pressure bar has a notch carved into it 18 and the butt end of the shaft to be measured is inserted through the notch 19 and against the butt stop 20 which is attached to the pressure bar in the angular position shown by means of two screws, rivets or other fastening devices, with the upper portion of the butt stop having a notch cut into it 21 which fits around the fastening device during use and allows for the butt stop to be pulled upward to a vertical position when not in use. A detailed depiction of the butt stop is presented at 22.

Figure 3:
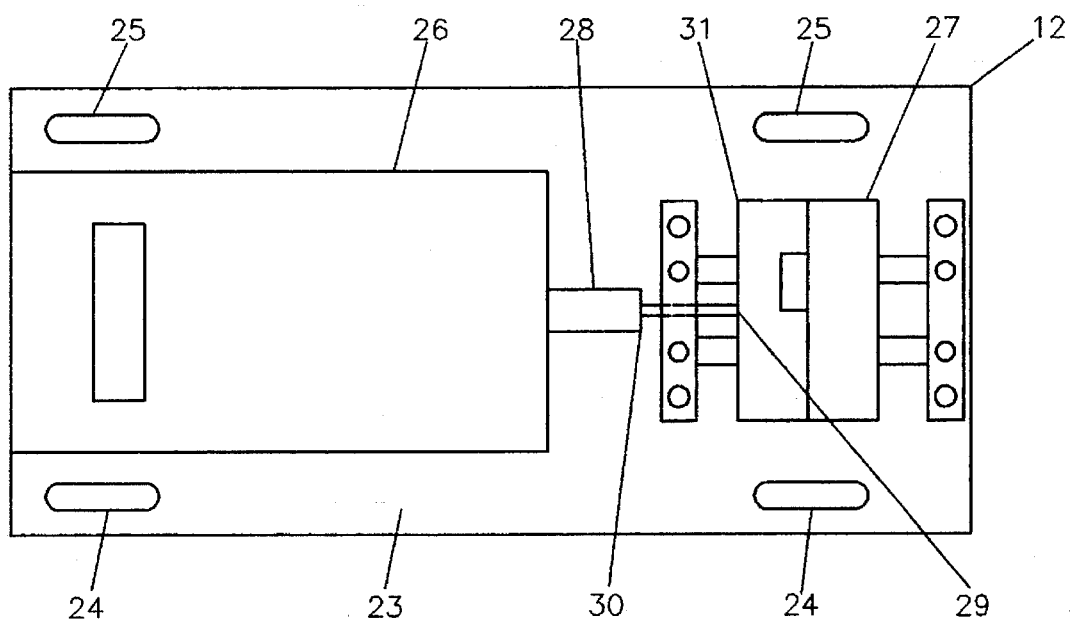
FIG. 3 shows the digital force gauge, mounting plate and pressure point assembly.

Referring now to FIG. 3, the details of the digital force gauge bracket is shown. The bracket mounting plate is indicated at 23 and is attached to the face of the backboard by a number of screws, rivets or other fastening devices which are inserted through bored holes 24,25. It is attached between the shaft butt stop and pressure bar bracket and the deflection bar assembly bracket as shown in 12. A commercially available digital force gauge which measures resistance to pressure is attached to the uppermost portion of the mounting plate 26. The gauge is further attached to an assembly consisting of a small bracket attached at a right angle to the mounting plate 27 which is connected to the gauge by means of two metal cylinders 28,29 with the smaller of these cylinders is attached to the larger 30 which is part of the gauge itself. The shaft to be measured is placed against the top of the small bracket 31 and when depressed the bracket moves downward causing a pressure reading to register on the gauge.

Figure 1:
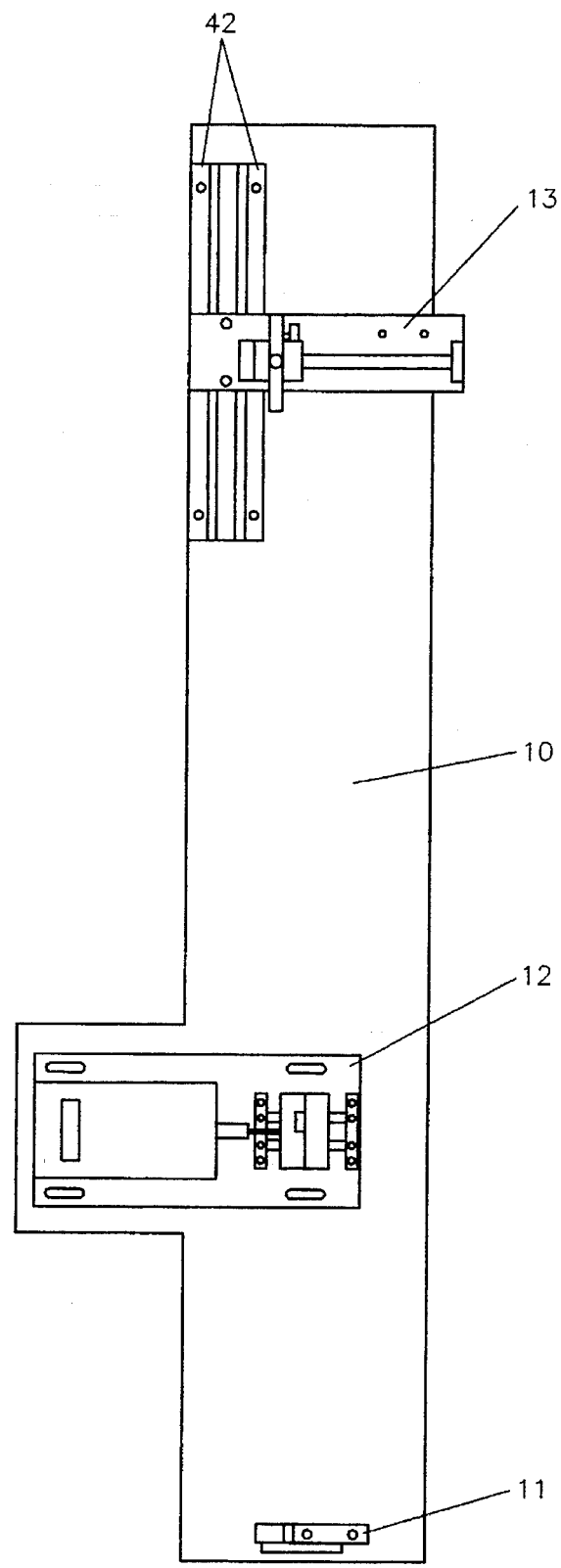
FIG. 1 depicts the invention from a top view.
Figure 4:
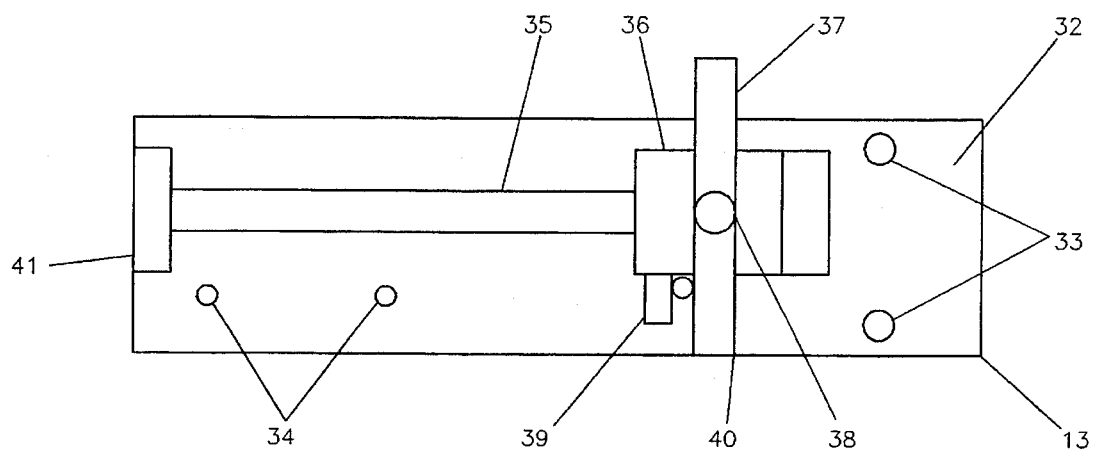
FIG. 4 illustrates the deflection bar assembly, its track and measurement rule.
Figure 5:
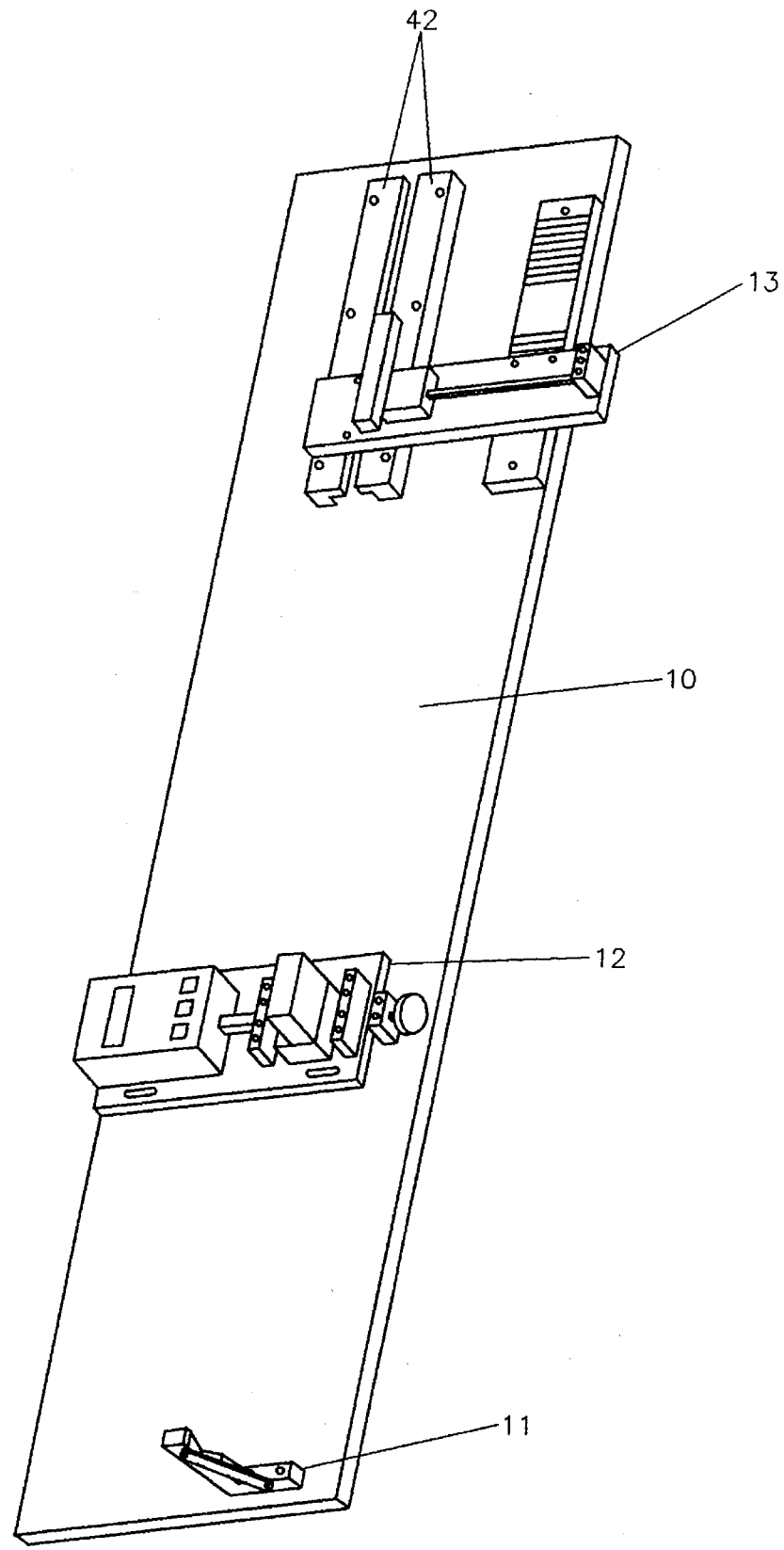
FIG. 5 illustrates a three-dimensional perspective of the invention.

Referring now to FIG. 4, the details of the deflection bar assembly is shown. The bracket 32 is attached to the face of the backboard by a number of screws, rivets or other mounting devices which are inserted through bored holes 33,34. It is attached to the backboard in the approximate position shown in 13. Attached to the face of the bracket is an assembly consisting of a vertical metal dowel 35 around which is placed a larger but shorter metal cylinder 36. This cylinder has attached to the face of it a small horizontal bar 37, dowel 38 and horizontally extending small rectangular metal piece 39. The tip end of the shaft to be measured is placed under the bottom of the small bar and depresses it to the small metal stop pin 41. Upon depressing the small horizontal bar to this stop pin a deflection reading is obtained. The deflection bar assembly also may be moved horizontally along a fixed track to accommodate shafts of different lengths. This is accomplished through the mounting of the bracket to two horizontal brackets as shown in FIG. 1 at 42. The deflection bar assembly can be moved along this track and locked at the appropriate distance from the shaft butt stop and pressure bar bracket for the particular shaft to be measured.

While a particular embodiment of the invention is shown, it will be understood by those skilled in the art that changes and modifications may be made thereto without departing from the invention in its broader aspects and as set forth in the following claims:

What is claimed is:

1. A method for measuring the flexibility and strength of golf club shafts through the use of a mechanical device comprised of:

a rectangular solid backboard which is positioned so as to place the two longer sides of its rectangular surface horizontally and parallel to each other and to which are attached three separately functioning units a first unit which is attached to the backboard at the extreme left of the backboard when the backboard is viewed as stated above, consisting of a permanently attached bracket with the bracket extending outward from the backboard to which is attached a movable bar against which the butt end of the golf club shaft to be measured is placed a second unit which is attached to the backboard between the first and third unit when the backboard is viewed as stated above, consisting of a digital force gauge mounted on a vertically adjustable backplate to which is attached a horizontal bar against which the golf club shaft to be measured is placed a third unit which is attached to the backboard at the extreme right of the backboard when the backboard is viewed as stated above, consisting of a vertical bar which moves horizontally along a track created by two or more horizontal backplates attached to the backboard and which is secured in place by means of a locking handle, with the tip end of the golf club shaft to be measured placed under a horizontal bar attached to the vertical bar, this horizontal bar being pressed downward during operation so as to pressure the tip end of the shaft.

2. A method as in claim 1, including the steps for producing a series of golf club shafts of consistent flexibility for irons numbered 1 through 9 and all wedges.

3. A method as in claim 1, including the steps for producing a series of golf club shafts of consistent flexibility for all woods including but not limited to those numbering from 1 through 15.

4. A method as in claim 1, including the steps of producing a series of golf club shafts of consistent flexibility comprising a set of shafts.

5. A method as in claim 1, wherein the step of trimming measured shafts is accomplished through the trimming of portions of the shaft from the shaft itself.

6. A method as in claim 1, where the units consist of wood, plastic or any metallic substance.

7. A method as in claim 1, where a very flexible shaft otherwise known as an L shaft is measured at 32 pounds of deflection, a flexible shaft otherwise known as an A shaft is measured at 34 pounds of deflection, a regular shaft otherwise known as an R shaft is measured at 38 pounds of deflection, a stiff shaft otherwise known as an S shaft is measured at 42 pounds of deflection, and an extra stiff shaft otherwise known as an X shaft is measured at 46 pounds of deflection.

* * * * *